United States Patent
Nakano et al.

(10) Patent No.: US 8,059,199 B2
(45) Date of Patent: Nov. 15, 2011

(54) SYNCHRONIZING SIGNAL DETECTION CIRCUIT

(75) Inventors: Takamichi Nakano, Tokyo (JP); Ryota Mizoguchi, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 661 days.

(21) Appl. No.: 12/207,520

(22) Filed: Sep. 10, 2008

(65) Prior Publication Data

US 2009/0237559 A1    Sep. 24, 2009

(30) Foreign Application Priority Data

Sep. 26, 2007   (JP) ................. 2007-248738

(51) Int. Cl.
*H04N 5/10* (2006.01)
(52) U.S. Cl. .................. 348/531; 348/533; 348/525
(58) Field of Classification Search ........... 348/525–535
See application file for complete search history.

(56) References Cited

U.S. PATENT DOCUMENTS 5,159,454 A * 10/1992 Mori ....................... 348/531
7,691,067 B2 * 4/2010 Westbrook et al. ......... 600/485

FOREIGN PATENT DOCUMENTS

JP        2001275014       10/2001

* cited by examiner

*Primary Examiner* — Michael Lee
(74) *Attorney, Agent, or Firm* — Studebaker & Brackett PC; Donald R. Studebaker

(57) ABSTRACT

The present invention provides a synchronizing signal detection circuit capable of always stably detecting a synchronizing signal. The synchronizing signal detection circuit predicts detection positions of synchronizing pulses every synchronization cycle peculiar to an input video signal. The synchronizing signal detection circuit further supplies the input video signal to a plurality of unnecessary signal eliminating paths in common and extracts synchronizing signals of every path respectively from video signals of every path obtained by eliminating unnecessary signals according to the characteristics of the paths every path. Then, the synchronizing signal detection circuit acquires detection positions of synchronizing pulses of the synchronizing signals of every path, selects a synchronizing signal of every path at which a difference in time between each of the detection positions of every path and the predicted detection position is minimal, and sets the selected synchronizing signal as an output synchronizing signal.

4 Claims, 5 Drawing Sheets

WHERE SELECTED SYNCHRONIZING SIGNAL EXISTS ANTERIOR TO PREDICTED DETECTION POSITION

WHERE SELECTED SYNCHRONIZING SIGNAL EXISTS POSTERIOR TO PREDICTED DETECTION POSITION

SYNCHRONIZING SIGNAL DETECTION CIRCUIT

BACKGROUND OF THE INVENTION

The present invention relates to a synchronizing signal detection circuit which detects a corresponding synchronizing signal from a video signal including synchronizing signals.

A patent document 1 (Japanese Unexamined Patent Publication No. 2001-275014) has disclosed a video signal processing device which, even though a pedestal level of an analog video signal inputted thereto varies, outputs a digital video signal whose pedestal level is always controlled to a preset black level. Using such a device makes it possible to avoid abnormalities in the hue of a reproduced image.

Meanwhile, a synchronization failure or error such as video blurring caused by an inability to accurately detect a synchronizing signal contained in a video signal due to the influence of high-frequency noise or the like becomes a problem as well as a problem associated with an abnormality in brightness such as a hue abnormality that causes an abnormality in video reproduction.

FIG. 1 shows a synchronizing signal detection circuit for a conventional video signal. In the figure, an input video signal S10 inputted from a video signal input terminal 10 is inputted to an IIR filter unit 11. The IIR filter unit 11 outputs a video signal S11 obtained by eliminating high-frequency noise components from the input video signal S10. The video signal S11 is inputted to a synchronizing signal extraction unit 21, which detects a synchronizing signal contained in the video signal S11 and outputs it as a synchronizing signal S21.

However, error detection of a synchronizing signal still occurs depending on such related arts. Since the difference in level between effective data and a synchronizing signal is large where, for example, the end of an effective data period of a video signal is terminated at high-brightness data, the synchronizing signal is rounded in its waveform and erroneously detected depending on the effective data when it is caused to pass through an IIR filter. The error detection of the synchronizing signal leads to synchronization errors and becomes the cause of occurrence of video blurring.

SUMMARY OF THE INVENTION

The present invention has been made in view of the following problems. It is therefore an object of the present invention to provide a synchronizing signal detection circuit capable of always stably detecting a synchronizing signal.

According to one aspect of the present invention, for attaining the above object, there is provided a synchronizing signal detection circuit which generates an output synchronizing signal, based on a synchronizing pulse detected from an input video signal, comprising detection position predicting means for predicting a detection position of the synchronizing pulse every synchronization cycle peculiar to the input video signal, unnecessary signal eliminating means for supplying the input video signal to a plurality of unnecessary signal eliminating paths in common thereby to eliminate unnecessary signals according to characteristics of the paths every path, thereby obtaining video signals of every path, detection position detecting means for extracting synchronizing signals of every path from the video signals and detecting detection positions of synchronizing pulses of the synchronizing signals, respectively, and output synchronizing signal selecting means for selecting a synchronizing signal of every path at which a difference in time between each of the detection positions of the synchronizing pulses obtained every path and the detection position predicted by the detection position predicting means is minimal and setting the selected synchronizing signal as the output synchronizing signal.

According to the synchronizing signal detection circuit related to the present invention, there is provided such a configuration that a path for eliminating unnecessary signals according to the state of an input video signal is automatically selected. It is thus possible to detect a synchronizing signal stably.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will be described in detail with reference to the accompanying drawings.

First Preferred Embodiment

Figure 2:
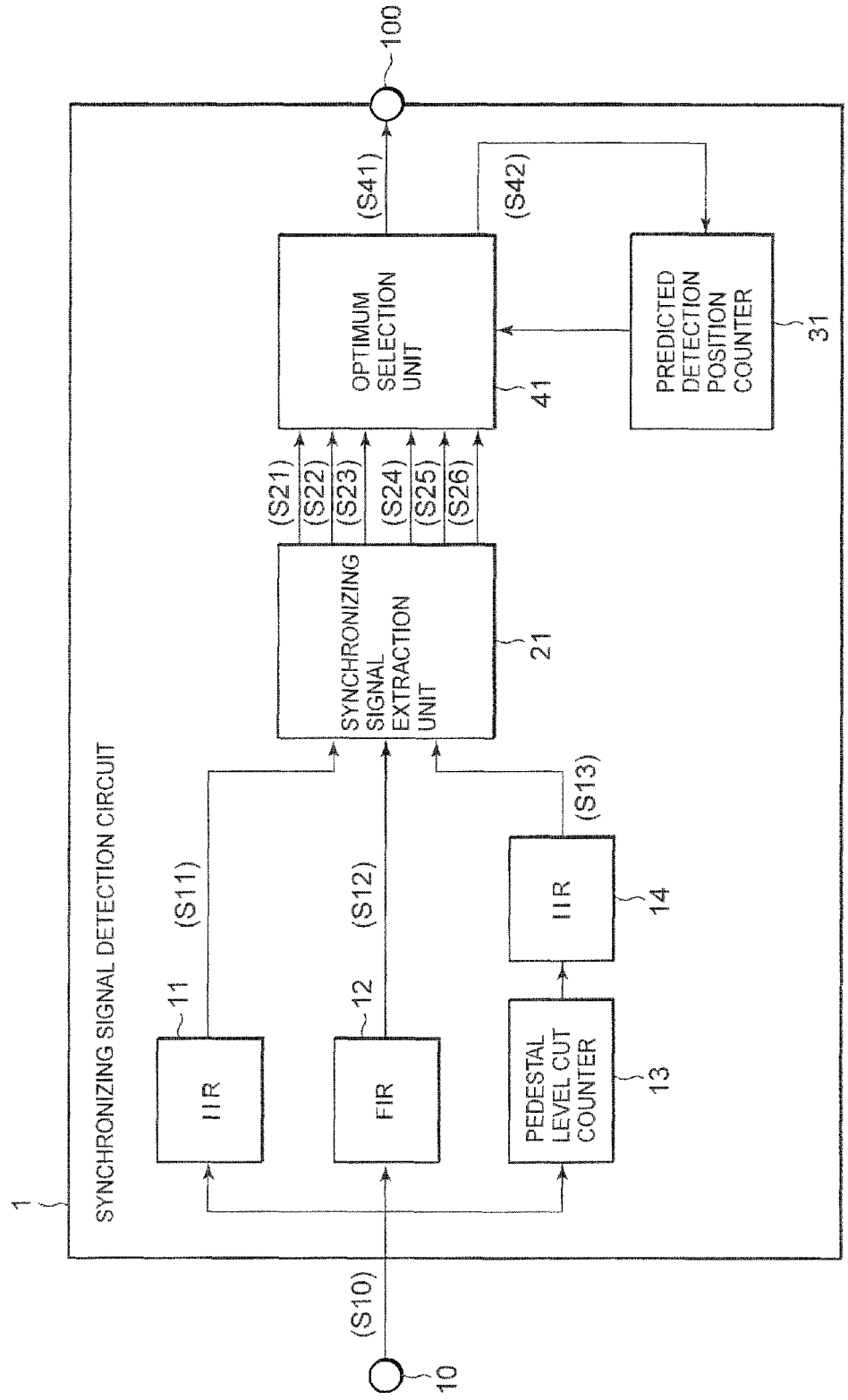
FIG. 2 shows a first preferred embodiment and is a block diagram illustrating a configuration of a synchronizing signal detection circuit according to the present invention.

FIG. 2 shows a first preferred embodiment and illustrates a configuration of a synchronizing signal detection circuit according to the present invention. The synchronizing signal detection circuit 1 includes an IIR filter unit 11, an FIR filter unit 12, a pedestal level cut unit 13, an IIR filter unit 14, a synchronizing signal extraction unit 21, a predicted detection position counter 31 and an optimum selection unit 41.

An input video signal S10 inputted to the synchronizing signal detection circuit 1 is captured by a video signal input terminal 10. The video signal input terminal 10 is connected to the IIR filter unit 11, the FIR filter unit 12 and the pedestal level cut unit 13 and inputs the input video signal S10 to them in common. The IIR filter unit 11 is provided with an IIR (Infinite Impulse Response) filter. The IIR filter unit 11 outputs a video signal S11 obtained by performing a predetermined filtering process on the input video signal S10 thereby to remove or eliminate unnecessary signals such as high-frequency noise components and inputs the same to the synchronizing signal extraction unit 21. The FIR filter unit 12 is provided with an FIR (Finite Impulse Response) filter. The FIR filter unit 12 outputs a video signal S12 obtained by performing a predetermined filtering process on the input video signal S10 thereby to eliminate unnecessary signals such as high-frequency noise components and inputs the same to the synchronizing signal extraction unit 21. The pedestal level cut unit 13 performs a process for cutting data at which a signal level is greater than or equal to a predetermined pedestal level, on the input video signal S10 and inputs the so-obtained video signal to the IIR filter unit 14. The IIR filter unit 14 is provided with an IIR filter. The IIR filter unit 14 outputs a video signal S13 obtained by performing a predetermined filtering process on the signal inputted from the pedestal level cut unit 13 thereby to eliminate unnecessary signals such as high-frequency noise components and inputs the same to the synchronizing signal extraction unit 21.

The synchronizing signal extraction unit 21 extracts synchronizing signals S21 through S23 relative to the respective video signals S11 through S13 set on a path-by-path basis and inputs detection position signals S21 through S23 each indicative of a detected position of a synchronizing pulse on a time base to the optimum selection unit 41. The synchronizing signals S21 through S23 of every path and the detection position signals S24 through S26 of every path respectively correspond to one another in a one-to-one relationship. For example, the synchronizing signal S21 is outputted from the video signal S11 inputted to the IIR filter unit 11, and the detection position signal S24 indicative of the detection position at the synchronizing signal S21 is outputted.

The optimum selection unit 41 selects the optimum synchronizing signal out of the synchronizing signals S21 through S23, based on a predicted detection position signal S31 to be described later and outputs it to the outside as an output synchronizing signal S41 via a synchronizing signal output terminal 100. The optimum selection unit 41 inputs a detection position signal S42 indicative of a detection position of a synchronizing pulse of the output synchronizing signal S41 to the predicted detection position counter 31. The predicted detection position counter 31 counts up only a predetermined horizontal synchronizing cycle with the detection position signal S42 supplied from the optimum selection unit 41 as the reference to predict the position of the next synchronizing signal and inputs the so-obtained predicted position to the optimum selection unit 41 as the predicted detection position signal S31.

Figure 3:
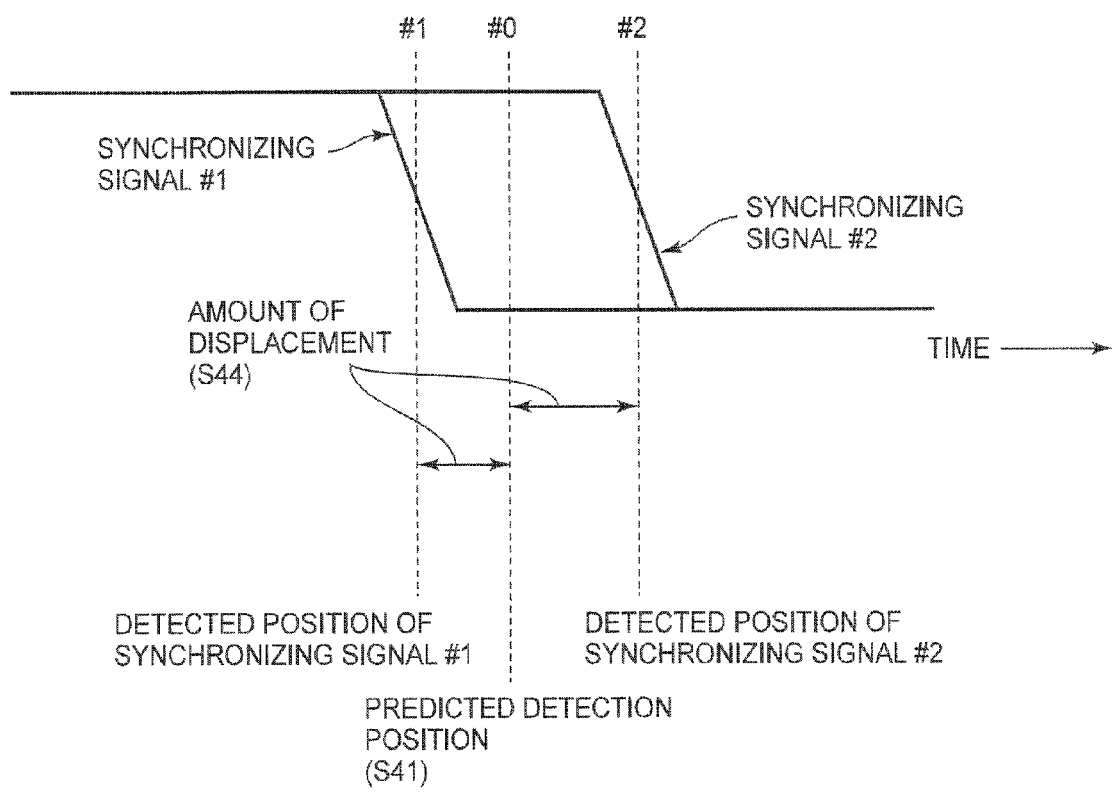
FIG. 3 is a diagram for describing the manner in which the optimum synchronizing signal is selected in the synchronizing signal detection circuit.

FIG. 3 describes the manner in which the optimum synchronizing signal is selected in the synchronizing signal detection circuit. In the present figure, the horizontal axis indicates a time base, and two synchronizing signals #1 and #2 are shown by way of example. For example, the synchronizing signal #1 corresponds to the synchronizing signal S21 outputted from the IIR filter (refer to FIG. 2), and the synchronizing signal #2 corresponds to the synchronizing signal S22 (refer to FIG. 2) outputted from the FIR filter.

As shown in the figure, the detected or detection positions of two synchronizing signals #1 and #2 are determined depending on detection position signals. A predicted detection position defined based on a predicted detection position signal (S41) is compared with these detection positions, whereby differences in time between the two, i.e., the amounts of displacements (S44) are obtained respectively. The synchronizing signal smallest in displacement between the so-obtained amounts of displacements is selected. In the illustrated example, the synchronizing signal #1 is selected.

In the first preferred embodiment referred to above, there is provided such a configuration that a path for eliminating unnecessary signals according to the state of the input video signal is selected automatically. It is thus possible to reduce error detection of each synchronizing signal.

Incidentally, although the three unnecessary signal eliminating paths have been used in the first preferred embodiment, no limitation is imposed on the present invention. 2 through N (where N: positive number) unnecessary signal eliminating paths may be prepared. While the effect of the invention that reduces error detection even by the provision of the two paths is obtained, such a configuration that the optimum one of, preferably, three or more paths is selected produces more effects. It is considered that a path for the FIR filter is effective where its signal is relatively close to a standard signal, whereas a path for the IIR filter is effective at a video signal on which a large quantity of noise are overlaid in a poor electric wave state and at a weak electric field. A path that cuts a pedestal level or more is effective in reducing the amount of bluntness of the input video signal, which is caused by filtering.

Second Preferred Embodiment

Figure 4:
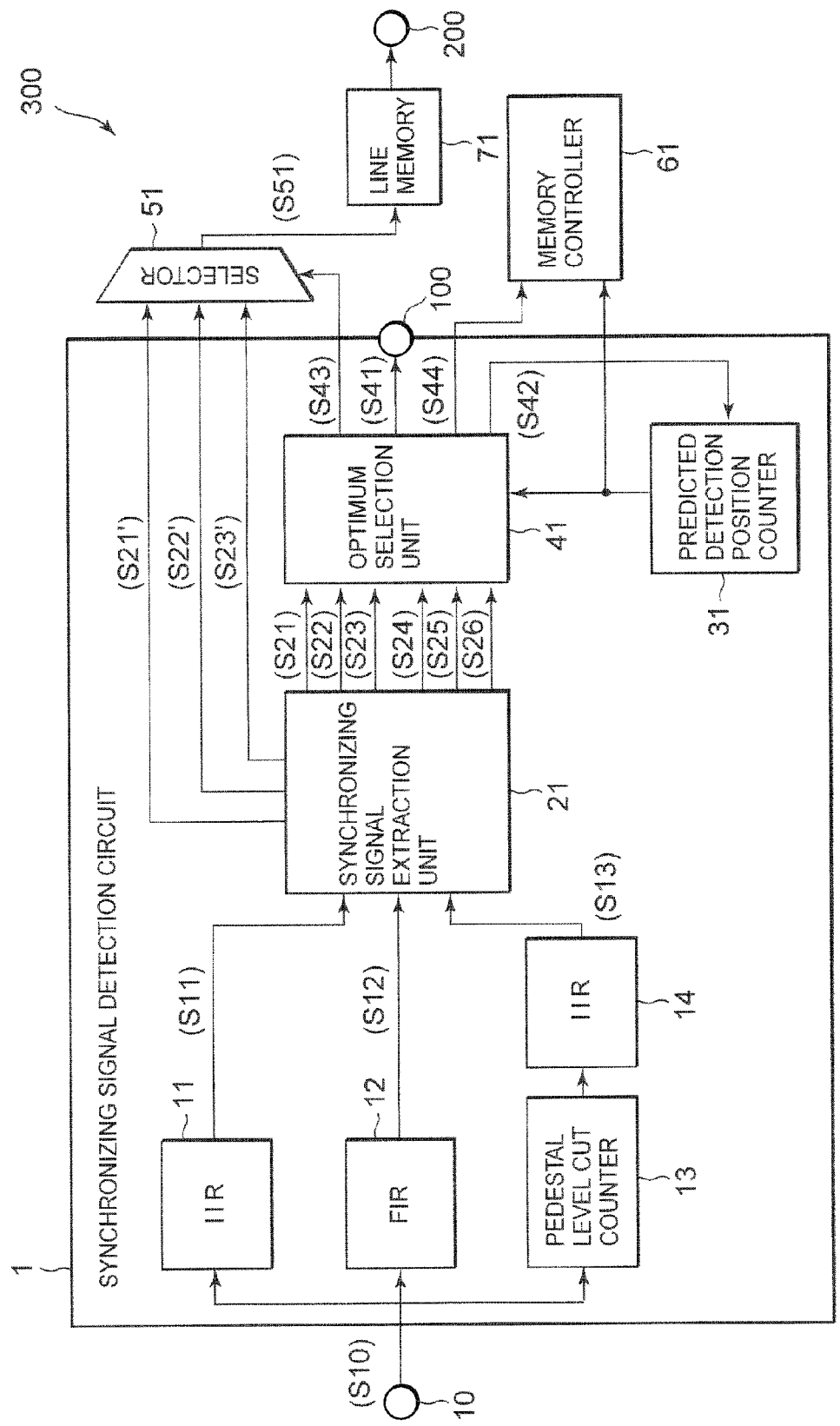
FIG. 4 shows a second preferred embodiment and is a block diagram illustrating a configuration of a synchronizing signal detection circuit according to the present invention.

FIG. 4 shows a second preferred embodiment and illustrates a video signal processing device including a synchronizing signal detection circuit according to the present invention. The video signal processing device 300 basically includes a synchronizing signal detection circuit 1 having a configuration basically similar to one described in the first preferred embodiment and further includes a selector 51, a memory controller 61 and a line memory 71. Parts different from the first preferred embodiment will be explained below.

A synchronizing signal extraction unit 21 detects synchronizing signals S21, S22 and S23 and, at the same time, outputs video signals S21', S22' and S23' corresponding to the respective synchronizing signals to the selector 51. An optimum selection unit 41 selects the optimum one out of the synchronizing signals S21 through S23, based on a predicted detection position signal S31 and outputs the same to the outside as an output synchronizing signal S41 via a synchronizing signal output terminal 100. At this time, the optimum selection unit 41 inputs a select signal S43 for selecting any of the video signals S21', S22' and S23' to the selector 51 and generates the amount of displacement S44 indicative of a difference in time between the output synchronizing signal S41 and the predicted detection position signal S31, followed by input to the memory controller 51.

The selector 51 inputs a video signal corresponding to the contents of the select signal S43 to the line memory 71 as a video signal S51. Incidentally, the video signal selected out of the video signals S21', S22' or S23' is normally of a video signal corresponding to the synchronizing signal selected as the output synchronizing signal S41. Since, however, a pedestal level-cut video signal does not contain effective data, other video signals are selected.

The line memory 71 is of a memory which stores the input vided signal S51 therein by an FIFO system. The line memory 71 reads the video signal S51 in accordance with a read control signal S61 outputted from the memory controller 61 and outputs the same to the outside as a video signal S71 via a video signal output terminal 200.

The memory controller 61 generates the read control signal S61 for giving the starting position of effective data to be read of the video signal S51 stored in the line memory 71. The memory controller 61 corrects the amount of difference between the predicted detection position (S31) supplied from the predicted detection position counter 31 and the starting position of the effective data, based on the amount of displacement S44 outputted from the optimum selection unit 41.

FIG. 5 explains control operations of the line memory by the memory controller. In the present figure, the horizontal axis indicates a time base. Different operations are performed depending on the positive and negative of the amount of displacement (S44).

Figure 5A:
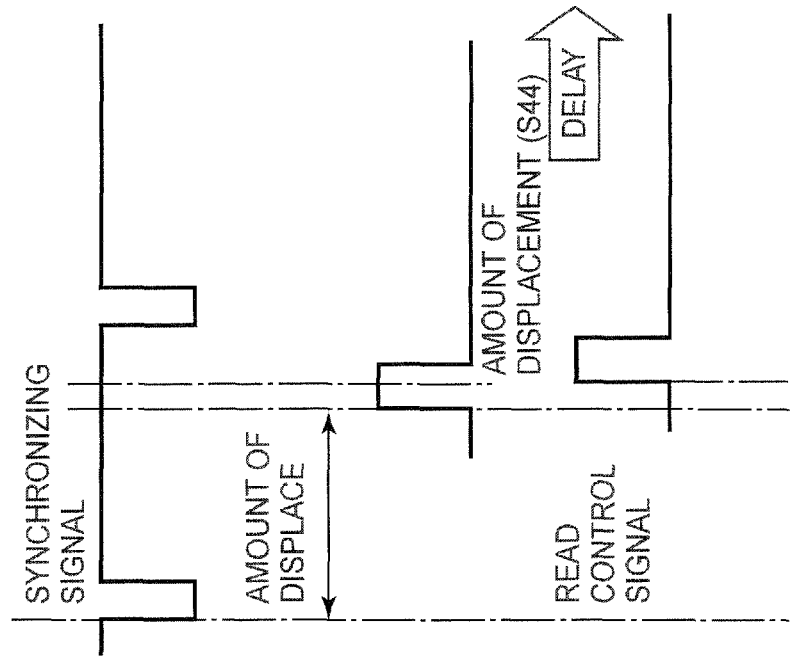
FIG. 5 is a diagram for describing control operations of a line memory by a memory controller in a video signal processing device.
Figure 5B:
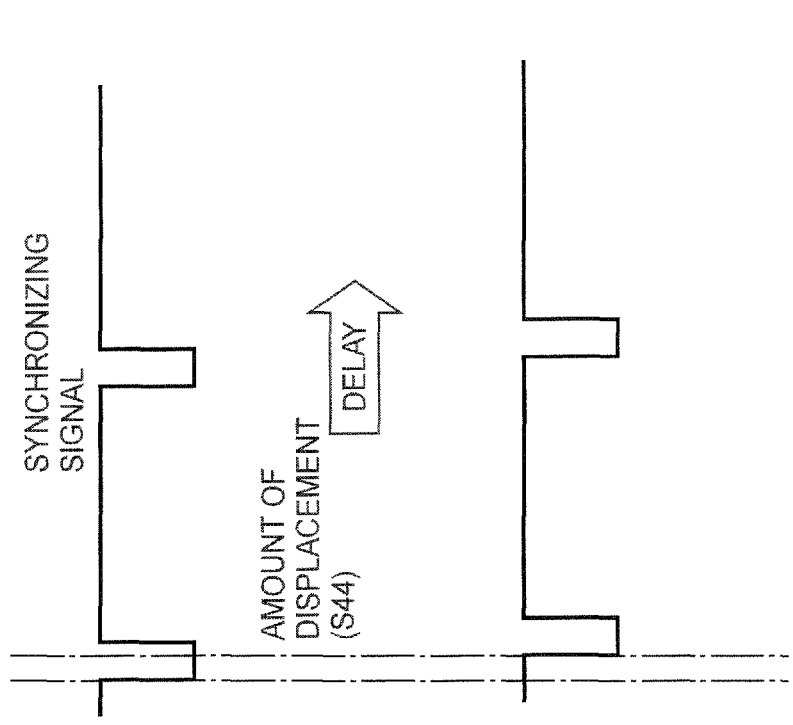

As shown in FIG. 5(a), a synchronizing signal based on a predicted detection position (S31) is delayed by an amount equivalent to the amount of displacement (S44) where the detected position of output synchronizing signal (S41) exists anterior to the predicted detection position (S31). As shown in FIG. 5(b), the amount of difference between a synchronizing signal based on a predicted detection position (S31) and a read control signal is increased by an amount equivalent to the amount of displacement (S44) where the detected position of selected synchronizing signal exists posterior to a predicted detection position (S31).

In the second preferred embodiment referred to above, a difference is determined by performing a comparison between a detected position of synchronizing pulse and a predicted detection position, and the amount of difference between a video signal and a synchronizing signal is corrected, thereby to perform a phase correction with respect to the video signal. It is thus possible to reduce image jitters every horizontal synchronizing period and thereby prevent image blurring.

While the preferred forms of the present invention have been described, it is to be understood that modifications will be apparent to those skilled in the art without departing from the spirit of the invention. The scope of the invention is to be determined solely by the following claims.

DRAWINGS

Figure 1:
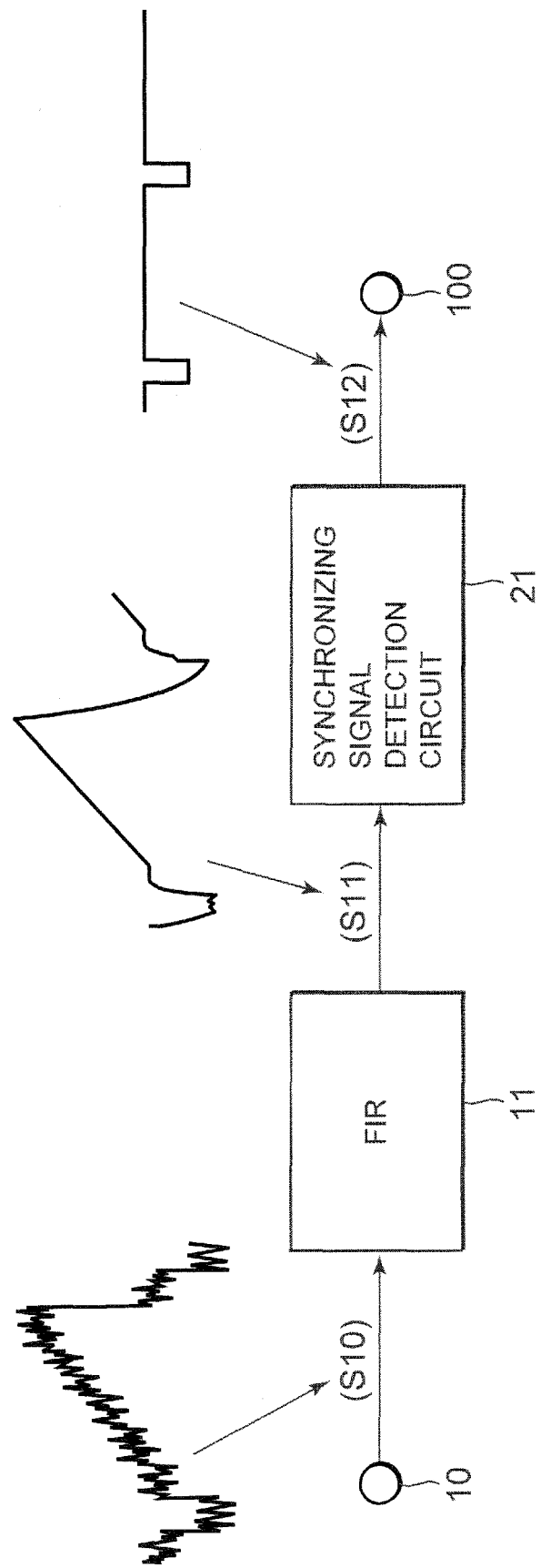
FIG. 1 is a block diagram showing a conventional synchronizing signal detection circuit.

FIG. 1
  21 ... SYNCHRONIZING SIGNAL DETECTION UNIT
FIG. 2
  1 ... SYNCHRONIZING SIGNAL DETECTION CIRCUIT, 13 ... PEDESTAL LEVEL CUT UNIT, 21 ... SYNCHRONIZING SIGNAL EXTRACTION UNIT, 31 ... PREDICTED DETECTION POSITION COUNTER, 41 ... OPTIMUM SELECTION UNIT
FIG. 3
  SYNCHRONIZING SIGNAL #1, SYNCHRONIZING SIGNAL #2 AMOUNT OF DISPLACEMENT TIME DETECTION POSITION OF SYNCHRONIZING SIGNAL #1, DETECTION POSITION OF SYNCHRONIZING SIGNAL #2 PREDICTED DETECTION POSITION
FIG. 4
  1 ... SYNCHRONIZING SIGNAL DETECTION CIRCUIT, 13 ... PEDESTAL LEVEL CUT UNIT, 21 ... SYNCHRONIZING SIGNAL EXTRACTION UNIT, 31 ... PREDICTED DETECTION POSITION COUNTER, 51 ... SELECTOR, 61 ... MEMORY CONTROLLER, 71 ... LINE MEMORY
FIG. 5
  (a) WHERE SELECTED SYNCHRONIZING SIGNAL EXISTS ANTERIOR TO PREDICTED DETECTION POSITION SYNCHRONIZING SIGNAL AMOUNT OF DISPLACEMENT DELAY
  (b) WHERE SELECTED SYNCHRONIZING SIGNAL EXISTS POSTERIOR TO PREDICTED DETECTION POSITION SYNCHRONIZING SIGNAL DIFFERENCE VALUE READ CONTROL SIGNAL AMOUNT OF DISPLACEMENT DELAY

What is claimed is:

1. A synchronizing signal detection circuit which generates an output synchronizing signal, based on a synchronizing pulse detected from an input video signal, comprising:
    detection position predicting means for predicting a detection position of the synchronizing pulse every synchronization cycle peculiar to the input video signal;
    unnecessary signal eliminating means for supplying the input video signal to a plurality of unnecessary signal eliminating paths in common thereby to eliminate unnecessary signals according to characteristics of the paths every said path, thereby obtaining video signals of every path;
    detection position acquiring means for extracting synchronizing signals of every path from the video signals and obtaining detection positions of synchronizing pulses of the synchronizing signals, respectively; and
    output synchronizing signal selecting means for selecting a synchronizing signal of every path at which a difference in time between each of the detection positions of the synchronizing pulses obtained every path and the detection position predicted by the detection position predicting means is minimal and setting the selected synchronizing signal as the output synchronizing signal.

2. The synchronizing signal detection circuit according to claim 1, wherein the detection position predicting means obtains a predicted detection position in the next synchronization period according to the detected position of synchronizing pulse of each synchronizing signal of every path selected during one synchronization period.

3. The synchronizing signal detection circuit according to claim 1 or 2, wherein the unnecessary signal eliminating means uses at least two of a path including an FIR filter, a path including an IIR filter and a path for fulfilling a pedestal level cut function as the unnecessary signal eliminating paths.

4. A video signal processing device including the synchronizing signal detection circuit described in claim 2, comprising:
    a memory con-roller which generates a read control signal, based on the predicted detection position; and
    a line memory which sequentially writes the input video signal and reads the written input video signal in accordance with the read control signal,
    wherein the memory controller corrects the phase of the read control signal, based on an amount of displacement supplied from the synchronizing signal detection circuit.

* * * * *